US008133832B2

(12) United States Patent
Kristen et al.

(10) Patent No.: US 8,133,832 B2
(45) Date of Patent: Mar. 13, 2012

(54) CATALYST SYSTEM FOR POLYMERIZATION OF OLEFINIC MONOMERS, PROCESS FOR PREPARING POLYMERS, AND POLYMERS PREPARED BY THE PROCESS

(75) Inventors: Marc Oliver Kristen, Sulzbach (DE); Rolf Mülhaupt, Freiburg (DE); Georg Müller, Freiburg (DE)

(73) Assignee: Basell Polyolefine GmbH, Wesseling (DE)

( * ) Notice: Subject to any disclaimer, the term of this patent is extended or adjusted under 35 U.S.C. 154(b) by 45 days.

(21) Appl. No.: 12/452,713

(22) PCT Filed: Jul. 22, 2008

(86) PCT No.: PCT/EP2008/005981
§ 371 (c)(1),
(2), (4) Date: Mar. 12, 2010

(87) PCT Pub. No.: WO2009/015804
PCT Pub. Date: Feb. 5, 2009

(65) Prior Publication Data
US 2010/0190931 A1  Jul. 29, 2010

Related U.S. Application Data

(60) Provisional application No. 60/965,426, filed on Aug. 20, 2007.

(30) Foreign Application Priority Data

Jul. 27, 2007  (EP) .................................... 07014837

(51) Int. Cl.
C08F 4/02 (2006.01)
C08F 4/642 (2006.01)
C08F 4/6592 (2006.01)

(52) U.S. Cl. ........ 502/109; 502/103; 502/152; 526/135; 526/142; 526/160; 526/165; 526/943

(58) Field of Classification Search .................. 502/103, 502/104, 109, 152; 526/135, 142, 160, 165, 526/943
See application file for complete search history.

(56) References Cited

U.S. PATENT DOCUMENTS

| | | |
|---|---|---|
| 3,242,150 A | 3/1966 | Scoggin |
| 3,248,179 A | 4/1966 | Norwood |
| 4,431,788 A | 2/1984 | Kaminsky |
| 5,153,157 A | 10/1992 | Hlatky et al. |
| 5,324,800 A | 6/1994 | Welborn, Jr. et al. |
| 5,372,980 A | 12/1994 | Davis |
| 5,565,534 A | 10/1996 | Aulbach et al. |
| 5,703,187 A | 12/1997 | Timmers |
| 5,710,297 A | 1/1998 | Weller et al. |
| 5,770,753 A | 6/1998 | Küber et al. |
| 5,840,948 A | 11/1998 | Rohrmann et al. |
| 6,620,953 B1 | 9/2003 | Bingel et al. |
| 2009/0326128 A1* | 12/2009 | Macossay-Torres .......... 524/413 |

OTHER PUBLICATIONS

Kathrina Weimann, Walter Kaminsky, Florian H. Gojny, Karl Schulte, "Synthesis and Properties of Syndiotactic Poly(propylene)/Carbon Nanofiber and Nanotube Composites Prepared by in situ Polymerization with Metallocene/MAO Catalysts," *Maromolecular Chemistry and Physics*, 2005, 206, 1472-1478.

Andreas Greiner and Joachim H. Wendorff, "Electrospinning: A Fascinating Method for the Peparation of Ultrathing Fibers," *Angew. Chem. Int. Ed.*, 2007, 46, 5670-5703.

H. Weisenfeldt et al., "*ansa*-Metallocene derivatives: Racemic and *meso* diastereomoers of group IV metallocene derivatives with symmetrically substituted, dimethylsilanediyl-bridged ligand frameworks. Crystal structure of R,S-ME$_2$Si(3-t-Bu-5-MeC$_5$H$_2$)$_2$ZrCl$_2$" *Journal of Oranometallic Chemistry*, 369 (1989) 359-370.

* cited by examiner

*Primary Examiner* — Caixia Lu
(74) *Attorney, Agent, or Firm* — William R. Reid; Dilworth IP

(57) ABSTRACT

The present invention relates to new catalyst supports comprising nanofibers, a catalyst system comprising these supports as well as a process for preparing nanocomposites and the nanocomposites prepared. The invention especially concerns a supported catalyst system for polymerization of olefins, comprising a support made of fibers or a fleece of fibers, wherein the mean fiber diameter is less than 1000 nm, preferably less than 500 nm and the mean fiber length is more than 200,000 nm, preferably more than 500,000 nm and especially preferred more than 1,000,000 nm as well as a process for polymerizing olefinic systems in the presence of these catalyst systems and the resulting nanocomposites.

10 Claims, 5 Drawing Sheets

CATALYST SYSTEM FOR POLYMERIZATION OF OLEFINIC MONOMERS, PROCESS FOR PREPARING POLYMERS, AND POLYMERS PREPARED BY THE PROCESS

CROSS-REFERENCE TO RELATED APPLICATIONS:

This application is a national phase filing under 35 U.S.C. §371 of International Application PCT/EP2008/005981, filed 22 Jul. 2008, claiming priority to European Patent Application 07014837.4 filed 27 Jul. 2007 and provisional U.S. Appl. Ser. No. 60/965,426, filed 20 Aug. 2007; the disclosures of International Application PCT/EP2008/005981, European Patent Application 07014837.4, and provisional U.S. Appl. Ser. No. 60/965,426, each as filed, are incorporated herein by reference.

The present invention relates to new catalyst supports comprising nanofibers, a catalyst system comprising these supports as well as a process for preparing nanocomposites and the nanocomposites prepared.

There is an increasing demand for new polymer materials. Different fillers have been introduced into a polyolefin matrix to either reduce the costs of the polyolefin or alter its properties. One example is a U.S. Pat. No. 4,431,788 which discloses a process for preparing a starch/polyolefin composite by polymerization of at least one olefin. A halogen free catalyst is used, which is prepared by treating the starch firstly with an alkylaluminum and subsequently with a metallocene.

In the following years, nanocomposites have been developed which comprise a soft polymer matrix and nanosized rigid filler materials leading to exceptionally strong materials. A general problem of these nanocomposites, however, is the distribution of the nanofillers in the polymer matrix, because the nanofillers tend to stay aggregated due to a high surface energy.

Thus, Wiemann et al., Macromol. Chem. Phys. 2005, 206, 1472-1478 suggest to pre-treat carbon nanotubes and carbon nanofibers by ultrasound prior to polymerization. They disclose the preparation of different polypropylene nanocomposites by the in situ polymerization of propylene with a metallocene/MAO catalyst.

Although this method enhances the distribution of nanofillers in the polymer matrix there is still demand for improving distribution.

It is therefore an object of the present invention to provide a new nanocomposite having an improved distribution of fillers in the polymermatrix.

Figure 1:
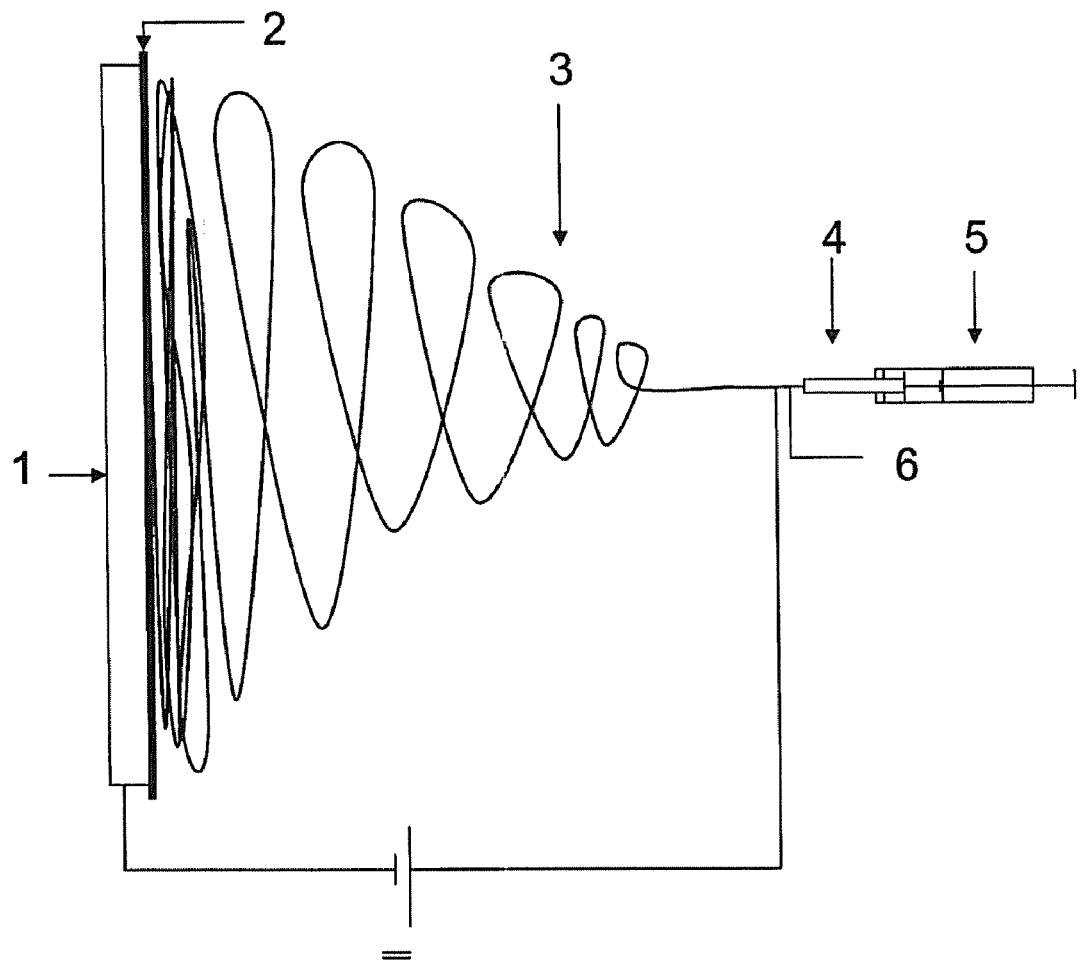
FIG. 1 illustrates an apparatus for preparing a nanofiber fleece.
Figure 2A:
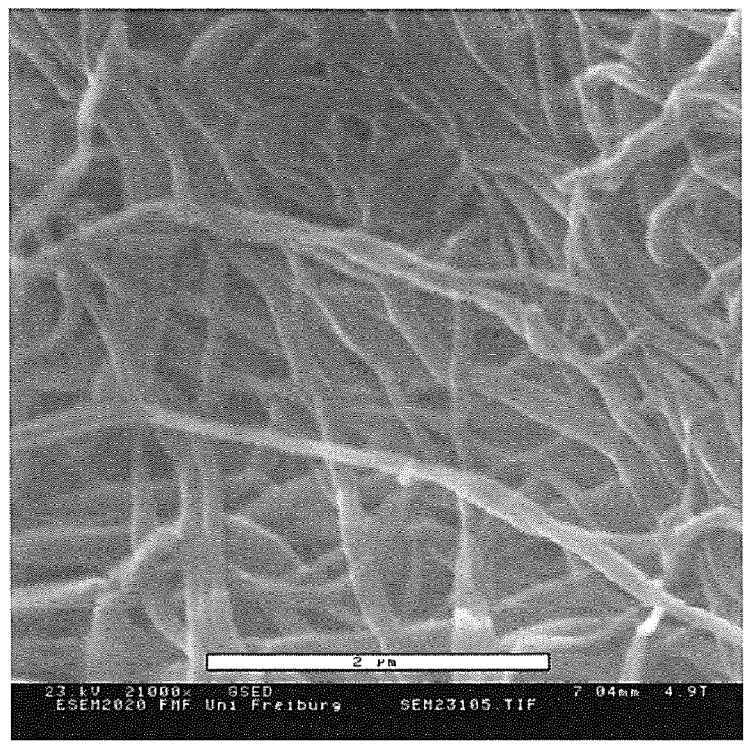
FIGS. 2a-2d illustrate Environmental Scanning Electron Microscopy (ESEM) images of PVA-nanofiber fleeces (Example 1).
Figure 2B:
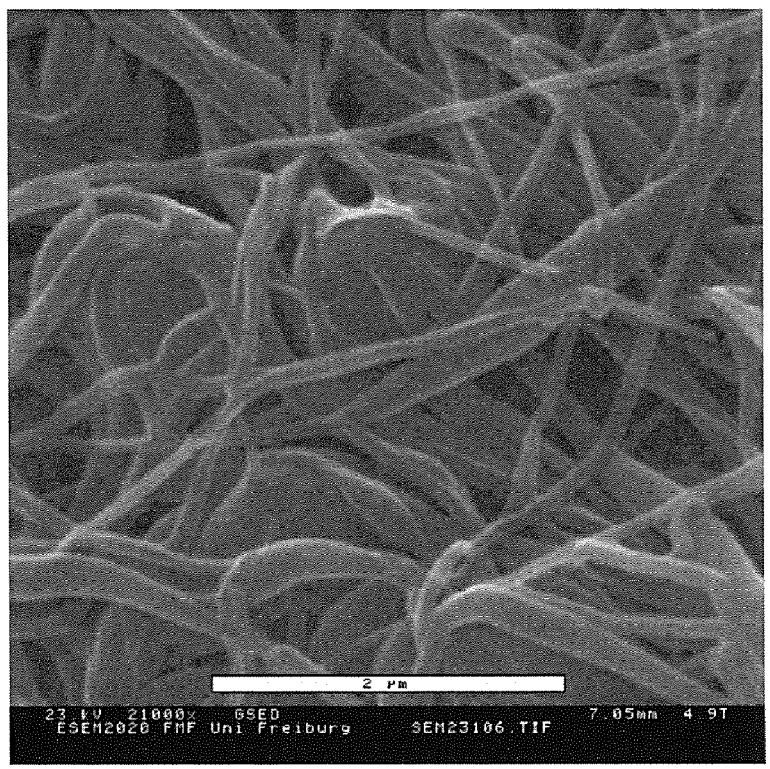
Figure 2C:
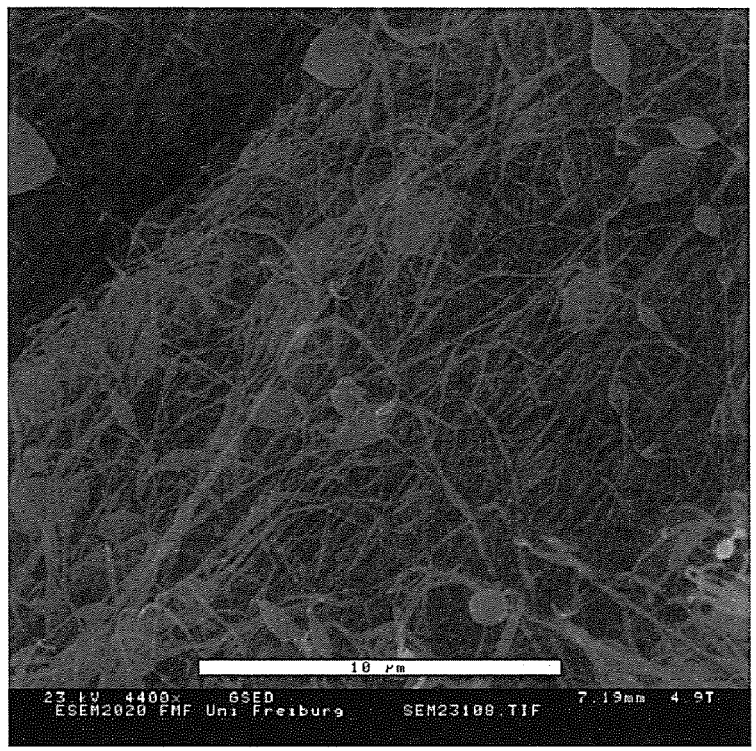
Figure 2D:
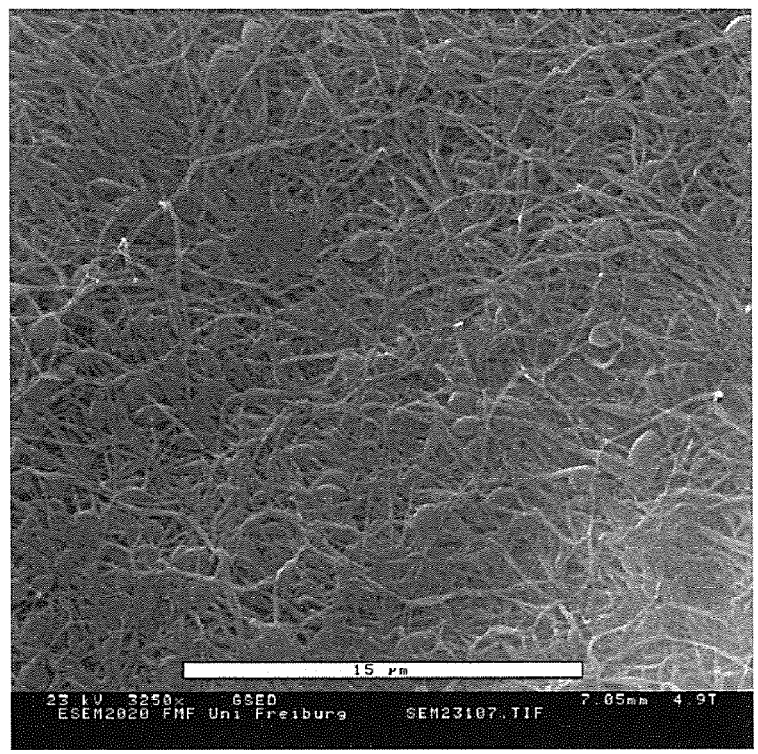
Figure 3A:
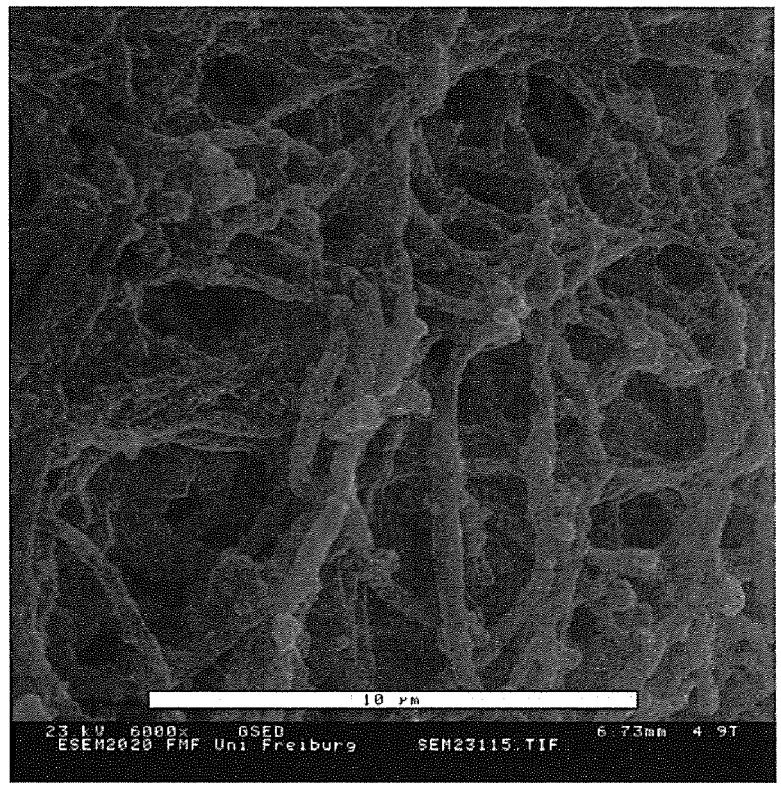
FIGS. 3a-3d illustrate Environmental Scanning Electron Microscopy (ESEM) images of PVA-nanofiber fleeces after loading PVA nanofibers with MAO and bis(pentadienyl) zirconium dichloride and performing heterogenous polymerization of olefins in presence of the catalyst system (Example 3).
Figure 3B:
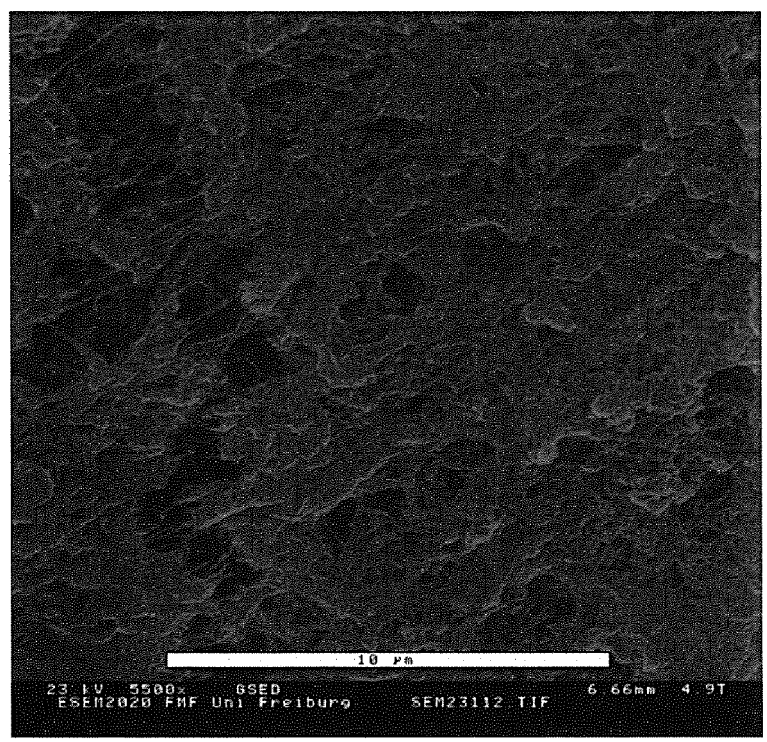
Figure 3C:
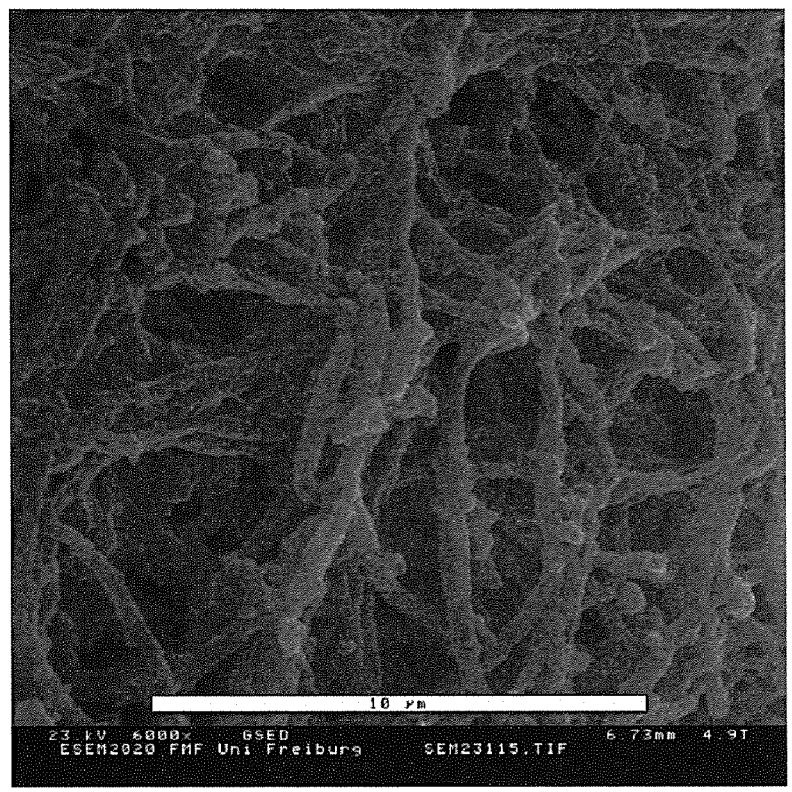
Figure 3D:
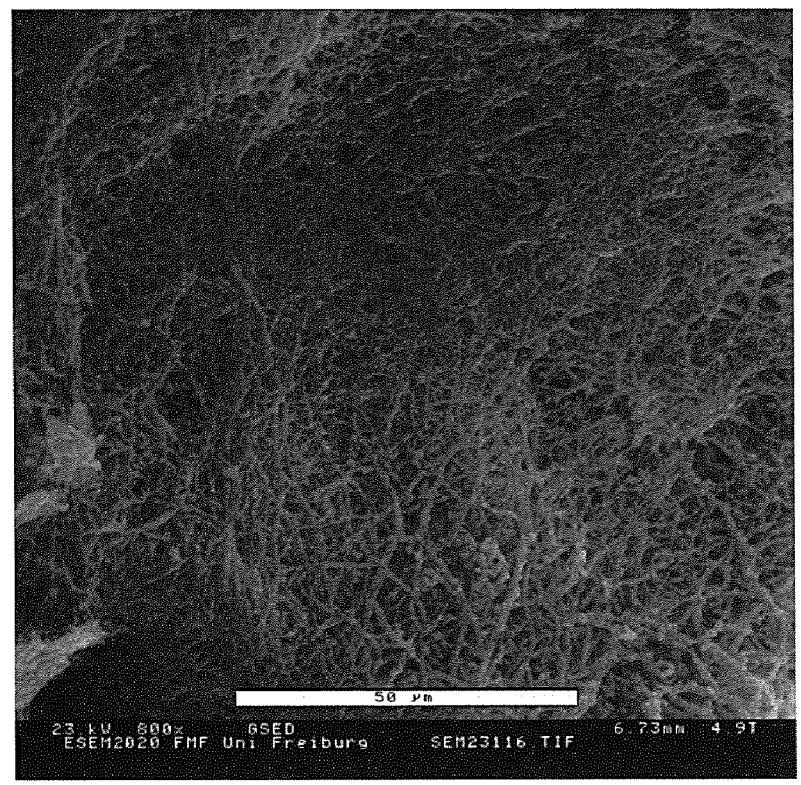

The problem of poor distribution is solved by a new catalyst system comprising a support made of nanofibers or nanofiberfleece, which is loaded with a cocatalyst for the polymerization of olefinic monomers.

The fiber diameter is less than 1000 nm and the fiber has a length of at least 200.000 nm. Preferably, the fiber diameter is less than 500 nm and the length at least 500.000 nm and especially preferred the fiber diameter is between 50 and 300 nm and the length more than 1000.000 nm. Preferably the fibers are so-called endless fibers, which preferable are produced by electrospinning.

A process for electrospinning is known since 1934. Nanofibers having a diameter of less than 1 µm and their fleeces (non-woven) may be produced. Depending on spin parameters thin fibers or structured and porous fibers can be obtained. Special spin processes make it possible to produce hollow fibers or fibers which cores are filled with liquid (core/shell fibers). Pores may be controlled by addition of porogenes, i.e. organic or inorganic compounds which may be removed from the fiber by a solvent.

A general overview of electrospinning may be taken from S. Ramakrishna, K. Fujihara W.-E. Teo, T-C. Lim and Z. Ma, "An Introduction to Electrospinning and Nanofibers", World Scientific Publishing Company, Singapore 2005. Different applications of electrospinning are disclosed by Greiner, A, Wendorff, J. H., in Angewandte Chemie 2007, 119, 5770-5805.

The support may comprise organic nanofibers or nanofiber fleeces which are produced by electrospinning of one or more soluble polymers. Preferred are water soluble polymers, for example polyvinyl alcohol, vinyl alcohol copolymers, e.g. ethylene vinyl alcohol copolymers or ethylene vinyl alcohol vinyl acetate copolymers, vinyl pyrrolidone homopolymers and copolymers, methacrylic acid homopolymers and copolymers, polysaccharides, e.g. starch, cellulose. Further preferred are polymers soluble in organic solvent, such as styrene, vinyl acetate, methacrylic acid ester, acrylonitrile homopolymers and copolymers.

It is also possible to electrospin inorganic or organic/inorganic brines, i.e. nano or micro particles forming a stable dispersion in water or organic solvents (organic brines). Examples are all kinds of silicates, boehmites, alumina, titanium dioxides, silica and their mixtures as well as their mixtures with soluble polymers.

The support is formed by electrospinning of organic brines or organic brine/polymer mixtures, e.g. products of hydrolysis of alkoxy silanes (tetraethoxysilane, monoalkyl or monoaryl trialkoxysilanes etc.), dialkyl and monoalkyl silanes.

Catalysts may be supported on inorganic or organic nanofibers which are able of ion exchange such as mixtures of water soluble high molecular polymers and phyllosilicates able of cation exchange or partially or totally neutralized methacrylic acid homopolymers or copolymers.

Further suitable polymers are water soluble polymer, e.g. polyvinyl alcohol in methanol, polystyrene in toluene, polyolefins in xylol, acrylonitrile homopolymers and copolymers.

It is also possible to use core/shell nanofibers as a support for the catalyst. The catalyst may be applied on the outside of the shell or may be present in solution within the core of the fiber.

Also water soluble polymers filled with brines may be used, e.g. polyvinylalcohol and natriumsilicate brine (e.g. Levasil®, available from H. C. Starck GmbH, Goslar, Germany).

A controlled porosity may be applied to the support, e.g. by addition of leaching of porogenes, e.g. polyethyleneoxide for polyvinylalcohol, silicon for unpolar polymers and paraffin waxes for polyolefins.

Active fillers could also be added to the polymer solution, which then may be spun together with polymer. After polymerization they are within the polyolefin fibers or fleeces.

In a preferred embodiment a suitable organometallic compound of metals of main groups of the Periodic Table of the Elements acting as an activator for the catalyst is firstly applied to the support and this supported compound is subsequently brought into contact with the appropriate transition metal compound or compounds. The transition metal compounds may be applied to the catalyst or added to the polymerization medium. However, in special cases it might be advantageous firstly to apply the transition metal compound to the support and later the activator.

Suitable organometallic compounds acting as an activator are compounds of the formula (I),

$$M^1(R^{11})_r(R^{12})_s(R^{13})_t \qquad (I)$$

where $M^1$ is an element of a main group of the Periodic Table of the Elements, preferably an alkali metal, an alkaline earth metal or a metal of group 13 of the Periodic Table, i.e. boron, aluminum, gallium, indium or thallium, $R^{11}$ is hydrogen, $C_1$-$C_{10}$-alkyl, $C_6$-$C_{15}$-aryl, halo-$C_1$-$C_{10}$-alkyl, halo-$C_6$-$C_{15}$-aryl, $C_7$-$C_{40}$-arylalkyl, $C_7$-$C_{40}$-alkylaryl, $C_1$-$C_{10}$-alkoxy or halo-$C_7$-$C_{40}$-alkylaryl, halo-$C_7$-$C_{40}$-arylalkyl or halo-$C_1$-$C_{10}$-alkoxy, $R^{12}$ and $R^{13}$ are each hydrogen, halogen, $C_1$-$C_{10}$-alkyl, $C_6$-$C_{15}$-aryl, halo-$C_1$-$C_{10}$-alkyl, halo-$C_6$-$C_{15}$-aryl, $C_7$-$C_{40}$-arylalkyl, $C_7$-$C_{40}$-alkylaryl, $C_1$-$C_{10}$-alkoxy or halo-$C_7$-$C_{40}$-alkylaryl, halo-$C_7$-$C_{40}$-arylalkyl or halo-$C_1$-$C_{10}$-alkoxy, r is an integer from 1 to 3
and
s and t are integers from 0 to 2, with the sum r+s+t corresponding to the valence of $M^1$.

Among the metal compounds of the formula (I), preference is given to those in which
$M^1$ is aluminum and
$R^{17}$ $R^{16}$, $R^1$ and $R^{18}$ are each $C_1$-$C_{10}$-alkyl.

Particularly preferred metal compounds of the formula (I) are tri-n-butylaluminum, triisobutylaluminum, tri-n-propylaluminum, triisopropylaluminum, triethylaluminum, and trimethylaluminum and mixtures thereof.

Further suitable organometallic compounds are aluminoxanes. As aluminoxanes, it is possible to use, for example, the compounds described in WO 00/31090. Particularly useful aluminoxanes are open-chain or cyclic aluminoxane compounds of the general formulae (II) or (III)

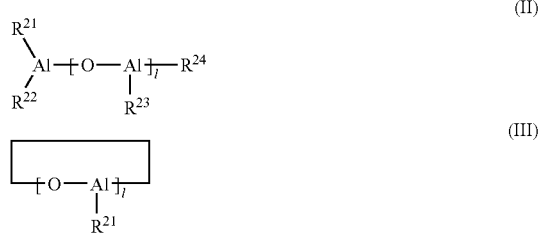

where $R^{21}$-$R^{24}$ are each, independently of one another, a $C_1$-$C_6$-alkyl group, preferably a methyl, ethyl, butyl or isobutyl group and l is an integer from 1 to 40, preferably from 4 to 25.

A particularly useful aluminoxane compound is methylaluminoxane.

It is also possible to use mixtures of various organometallic compounds of formula (I) or mixtures of compounds of formula (I) together with compounds of formula (II) or formula (III). The mixture of at least two different organometallic compounds of formula (I) can be a mixture of at least one aluminum-containing organometallic compound, e.g. an aluminium alkyl, and at least one boron-containing organometallic compound, e.g. a borate or a borane. However, the mixture can also comprise at least two different aluminum-containing organometallic compounds. Furthermore, mixtures of various aluminum-containing organometallic compounds together with boron-containing organometallic compounds can also be used.

According to an embodiment of the process of the present invention, a mixture of at least two different organometallic compounds is used for the preparation of the catalyst system. This may be a mixture of at least one aluminumalkyl compound and at least one aluminoxane. However, the catalyst system may also comprise at least two different aluminumalkyls. Furthermore, mixtures of various aluminumalkyls together with aluminoxanes also can be used.

The fibers and fiber fleeces treated with the organometallic compounds preferably are also supported with catalysts having at least one active center, preferably single-site transition metal catalysts.

For the purposes of the present invention, catalysts comprise at least one active center. The active center may be obtained from a transition metal coordination compound. However, it is also possible to use an active center derived from Ziegler catalysts or catalysts based on chromium, e.g. Phillips catalysts.

The invention also refers to hybrid catalyst systems comprising at least two different types of active centers derived from at least two chemically different starting materials. The different active centers can be active centers obtained from different transition metal coordination compounds. However, it is also possible to use active centers derived from Ziegler catalysts or catalysts based on chromium, e.g. Phillips catalysts.

Preference is given to the supported catalyst system as described above wherein the transition metal complex is a metallocene.

Metallocene catalyst components are, for example, cyclopentadienyl complexes. The cyclopentadienyl complexes can be, for example, bridged or unbridged biscyclopentadienyl complexes as described, for example, in EP 129 368, EP 561 479, EP 545 304 and EP 576 970, monocyclopentadienyl complexes such as bridged amidocyclopentadienyl complexes are described, for example, in EP 416 815, multinuclear cyclopentadienyl complexes as described in EP 632 063, π-ligand-substituted tetrahydropentalenes as described in EP 659 758 or π-ligand-substituted tetrahydroindenes as described in EP 661 300.

Suitable metallocenes are of the general formula (IV)

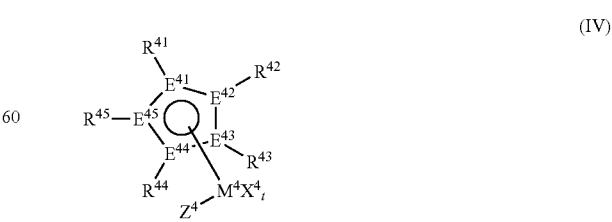

where the substituents and indices have the following meanings:

$M^4$ is a transition metal of groups 3-6 of the Periodic Table of the Elements, preferably group 4, e.g. Ti, Zr, Hf and especially preferred zirconium, $X^4$ is fluorine, chlorine, bromine, iodine, hydrogen, $C_1$-$C_{10}$-alkyl, $C_2$-$C_{10}$-alkenyl, $C_6$-$C_{15}$-aryl, arylalkyl having from 1 to 10 carbon atoms in the alkyl part and from 6 to 20 carbon atoms in the aryl part, —$OR^{46}$ or —$NR^{46}R^{47}$, or two radicals $X^4$ form a substituted or unsubstituted diene ligand, in particular a 1,3-diene ligand, and the radicals $X^4$ are identical or different and may be joined to one another, $E^{41}$-$E^{45}$ are each carbon or not more than one $E^{41}$ to $E^{45}$ is phosphorus or nitrogen, preferably carbon, t is 1, 2 or 3 and is, depending on the valence of $M^4$, such that the metallocene complex of the general formula (IV) is uncharged, where $R^{46}$ and $R^{47}$ are each $C_1$-$C_{10}$-alkyl, $C_6$-$C_{15}$-aryl, arylalkyl, arylalkyl, fluoroalkyl or fluoroaryl each having from 1 to 10 carbon atoms in the alkyl part and from 6 to 20 carbon atoms in the aryl part and $R^{41}$ to $R^{45}$ are each, independently of one another hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, arylalkyl having from 1 to 16 carbon atoms in the alkyl part and from 6 to 21 carbon atoms in the aryl part, $NR^{48}_2$, $N(SiR^{48}_3)_2$, $OR^{48}$, $OSiR^{48}_3$, $SiR^{48}_3$, where the organic radicals $R^{41}$-$R^{45}$ may also be substituted by halogens and/or two radicals $R^{41}$-$R^{45}$, in particular vicinal radicals, may also be joined to form a five-, six- or seven-membered ring, and/or two vicinal radicals $R^{41}$-$R^{45}$ may be joined to form a five-, six- or seven-membered heterocycle containing at least one atom from the group consisting of N, P, O and S, where the radicals $R^{48}$ can be identical or different and can each be $C_1$-$C_{10}$-alkyl, $C_3$-$C_{10}$-cycloalkyl, $C_6$-$C_{15}$-aryl, $C_1$-$C_4$-alkoxy or $C_6$-$C_{10}$-aryloxy and $Z^4$ is $X^4$ or

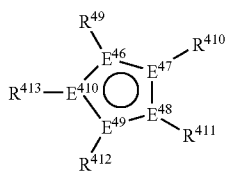

where the radicals $R^{49}$ to $R^{413}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, arylalkyl having from 1 to 16 carbon atoms in the alkyl part and 6-21 carbon atoms in the aryl part, $NR^{414}_2$, $N(SiR^{414}_3)_2$, $OR^{414}$, $OSiR^{414}_3$, $SiR^{414}_3$, where the organic radicals $R^{49}$-$R^{413}$ may also be substituted by halogens and/or two radicals $R^{49}$-$R^{413}$, in particular vicinal radicals, may also be joined to form a five-, six- or seven-membered ring, and/or two vicinal radicals $R^{49}$-$R^{413}$ may be joined to form a five-, six- or seven-membered heterocycle containing at least one atom from the group consisting of N, P, O and S, where the radicals $R^{414}$ are identical or different and are each $C_1$-$C_{10}$-alkyl, $C_3$-$C_{10}$-cycloalkyl, $C_6$-$C_{15}$-aryl, $C_1$-$C_4$-alkoxy or $C_6$-$C_{10}$-aryloxy, $E^{46}$-$E^{410}$ are each carbon or not more than one $E^{46}$ to $E^{410}$ is phosphorus or nitrogen, preferably carbon, or where the radicals $R^{44}$ and Z together form an —$R^{415}_v$-A- group, where $R^{415}$ is

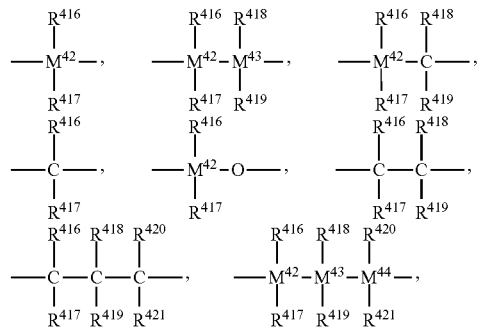

=$BR^{416}$, =$BNR^{416}R^{417}$, =$AlR^{416}$, —Ge—, —Sn—, —O—, —S—, =SO, =$SO_2$, =$NR^{416}$, =CO, =$PR^{416}$ or =$P(O)R^{416}$, where $R^{416}$-$R^{421}$ are identical or different and are each a hydrogen atom, a halogen atom, a trimethylsilyl group, a $C_1$-$C_{10}$-alkyl group, a $C_1$-$C_{10}$-fluoroalkyl group, a $C_6$-$C_{10}$-fluoroaryl group, a $C_6$-$C_{10}$-aryl group, a $C_1$-$C_{10}$-alkoxy group, a $C_7$-$C_{15}$-alkylaryloxy group, a $C_2$-$C_{10}$-alkenyl group, a $C_1$-$C_{40}$-arylalkyl group, a $C_8$-$C_{40}$-arylalkenyl group or a $C_7$-$C_{40}$-alkylaryl group or two adjacent radicals together with the atoms connecting them form a saturated or unsaturated ring having from 4 to 15 carbon atoms, and $M^{42}$-$M^{44}$ are each silicon, germanium or tin, or preferably silicon, A is —O—, >S—, >$NR^{422}$, —$PR^{422}$, =O, =S, =$NR^{422}$, —O—$R^{422}$, —$NR^{422}_2$, —$PR^{422}_2$ or an unsubstituted, substituted or fused, heterocyclic ring system, where the radicals $R^{422}$ are each, independently of one another, $C_1$-$C_{10}$-alkyl, $C_6$-$C_{15}$-aryl, $C_3$-$C_{10}$-cycloalkyl, $C_7$-$C_{18}$-arylalkyl or Si($R^{423}$)$_3$, $R^{423}$ is hydrogen, $C_1$-$C_{10}$-alkyl, $C_6$-$C_{15}$-aryl which may in turn bear $C_1$-$C_4$-alkyl groups as substituents or $C_3$-$C_{10}$-cycloalkyl, v is 1 or when A is an unsubstituted, substituted or fused, heterocyclic ring system may also be 0 or where the radicals $R^{44}$ and $R^{412}$ together form an —$R^{415}$— group.

A can, for example together with the bridge $R^{415}$, form an amine, ether, thioether or phosphine. However, A can also be an unsubstituted, substituted or fused, heterocyclic aromatic ring system which can contain heteroatoms from the group consisting of oxygen, sulfur, nitrogen and phosphorus in addition to ring carbons. Examples of 5-membered heteroaryl groups which can contain from one to four nitrogen atoms and/or a sulfur or oxygen atom as ring members in addition to carbon atoms are 2-furyl, 2-thienyl, 2-pyrrolyl, 3-isoxazolyl, 5-isoxazolyl, 3-isothiazolyl, 5-isothiazolyl, 1-pyrazolyl, 3-pyrazolyl, 5-pyrazolyl, 2-oxazolyl, 4-oxazolyl, 5-oxazolyl, 2-thiazolyl, 4-thiazolyl, 5-thiazolyl, 2-imidazolyl, 4-imidazolyl, 5-imidazolyl, 1,2,4-oxadiazol-3-yl, 1,2,4-oxadiazol-5-yl, 1,3,4-oxadiazol-2-yl and 1,2,4-triazol-3-yl. Examples of 6-membered heteroaryl groups which may contain from one to four nitrogen atoms and/or a phosphorus atom are 2-pyridinyl, 2-phosphabenzenyl, 3-pyridazinyl, 2-pyrimidinyl, 4-pyrimidinyl, 2-pyrazinyl, 1,3,5-triazin-2-yl and 1,2,4-triazin-3-yl, 1,2,4-triazin-5-yl and 1,2,4-triazin-6-yl. The 5-membered and 6-membered heteroaryl groups may also be substituted by $C_1$-$C_{10}$-alkyl, $C_6$-$C_{10}$-aryl, arylalkyl having from 1 to 10 carbon atoms in the alkyl part and 6-10 carbon atoms in the aryl part, trialkylsilyl or halogens such as fluorine, chlorine or bromine or be fused with one or more aromatics or heteroaromatics. Examples of benzo-fused 5-membered heteroaryl groups are 2-indolyl, 7-indolyl, 2-coumaronyl, 7-coumaronyl, 2-thionaphthenyl, 7-thionaphthenyl, 3-indazolyl, 7-indazolyl, 2-benzimidazolyl and 7-benzimidazolyl. Examples of benzo-fused 6-membered heteroaryl groups are 2-quinolyl, 8-quinolyl, 3-cinnolyl, 8-cinnolyl, 1-phthalazyl, 2-quinazolyl, 4-quinazolyl, 8-quinazolyl, 5-quinoxalyl, 4-acridyl, 1-phenanthridyl and 1-phenazyl. Naming and numbering of the heterocycles has been taken from L. Fieser and M. Fieser, Lehrbuch der organischen Chemie, $3^{rd}$ revised edition, Verlag Chemie, Weinheim 1957.

The radicals $X^4$ in the general formula (IV) are preferably identical, preferably fluorine, chlorine, bromine, $C_1$-$C_7$-alkyl or aralkyl, in particular chlorine, methyl or benzyl.

The synthesis of such complexes can be carried out by methods known per se, with the reaction of the appropriately substituted cyclic hydrocarbon anions with halides of zirconium being preferred. Examples of appropriate preparative methods are described, for example, in Journal of Organometallic Chemistry, 369 (1989), 359-370.

The metallocenes can be used in the rac (racemic) or pseudo-rac form. The term pseudo-rac refers to complexes in which the two cyclopentadienyl ligands are in the rac arrangement relative to one another when all other substituents of the complex are disregarded.

Examples of suitable metallocenes are, inter alia, methylenebis(cyclopentadienyl)zirconium dichloride, methylenebis(3-methylcyclopentadienyl)zirconium dichloride, methylenebis(3-n-butylcyclopentadienyl)zirconium dichloride, methylenebis(indenyl)zirconium dichloride, methylenebis(tetrahydroindenyl) zirconium dichloride, isopropylidenebis(cyclopentadienyl)zirconium dichloride, isopropylidenebis(3-trimethylsilylcyclopentadienyl)zirconium dichloride, isopropylidenebis(3-methylcyclopentadienyl)zirconium dichloride, isopropylidenebis(3-n-butylcyclopentadienyl)zirconium dichloride, isopropylidenebis(3-phenylcyclopentadienyl)zirconium dichloride, isopropylidenebis(indenyl)zirconium dichloride, isopropylidenebis(tetrahydroindenyl)zirconium dichloride, dimethylsilanediylbis(cyclopentadienyl)zirconium dichloride, dimethylsilanediylbis(indenyl)zirconium dichloride, dimethylsilanediylbis(tetrahydroindenyl)zirconium dichloride, ethylenebis(cyclopentadienyl)zirconium dichloride, ethylenebis(indenyl)zirconium dichloride, ethylenebis(tetrahydroindenyl)zirconium dichloride, tetramethylethylene-9-fluorenylcyclopentadienylzirconium dichloride, dimethylsilanediylbis(tetramethylcyclopentadienyl)zirconium dichloride, dimethylsilanediylbis(3-trimethylsilylcyclopentadienyl)zirconium dichloride, dimethylsilanediylbis(3-methylcyclopentadienyl)zirconium dichloride, dimethylsilanediylbis(3-n-butylcyclopentadienyl)zirconium dichloride, dimethylsilanediylbis(3-tert-butyl-5-methylcyclopentadienyl)zirconium dichloride, dimethylsilanediylbis(3-tert-butyl-5-ethylcyclopentadienyl)zirconium dichloride, dimethylsilanediylbis(2-methylindenyl)zirconium dichloride, dimethylsilanediylbis(2-isopropylindenyl)zirconium dichloride, dimethylsilanediylbis(2-tert-butylindenyl)zirconium dichloride, diethylsilanediylbis(2-methylindenyl)zirconium dibromide, dimethylsilanediylbis(3-methyl-5-methylcyclopentadienyl)zirconium dichloride, dimethylsilanediylbis(3-ethyl-5-isopropylcyclopentadienyl)zirconium dichloride, dimethylsilanediylbis(2-ethylindenyl)zirconium dichloride, dimethylsilanediylbis(2-methyl-4,5-benzindenyl)zirconium dichloride, dimethylsilanediylbis(2-ethyl-4,5-benzindenyl)zirconium dichloride, methylphenylsilanediylbis(2-methyl-4,5-benzindenyl)zirconium dichloride, methylphenylsilanediylbis(2-ethyl-4,5-benzindenyl)zirconium dichloride, diphenylsilanediylbis(2-methyl-4,5-benzindenyl)zirconium dichloride, diphenylsilanediylbis(2-ethyl-4,5-benzindenyl)zirconium dichloride, diphenylsilanediylbis(2-methylindenyl)zirconium dichloride, dimethylsilanediylbis(2-methyl-4-phenylindenyl)zirconium dichloride, dimethylsilanediylbis(2-ethyl-4-phenylindenyl)zirconium dichloride, dimethylsilanediylbis(2-methyl-4-(1-naphthyl)indenyl)zirconium dichloride, dimethylsilanediylbis(2-ethyl-4-(1-naphthyl)indenyl)zirconium dichloride, dimethylsilanediylbis(2-propyl-4-(1-naphthyl)indenyl)zirconium dichloride, dimethylsilanediylbis(2-i-butyl-4-(1-naphthyl)indenyl)zirconium dichloride, dimethylsilanediylbis(2-propyl-4-(9-phenanthryl)indenyl)zirconium dichloride, dimethylsilanediylbis(2-methyl-4-isopropylindenyl)zirconium dichloride, dimethylsilanediylbis(2,7-dimethyl-4-isopropylindenyl)zirconium dichloride, dimethylsilanediylbis(2-methyl-4,6-diisopropylindenyl)zirconium dichloride, dimethylsilanediylbis(2-methyl-4[p-trifluoromethylphenyl]indenyl) zirconium dichloride, dimethylsilanediylbis(2-methyl-4-[3',5'-dimethylphenyl]indenyl)zirconium dichloride, dimethylsilanediylbis(2-methyl-4-[4'-tert-butylphenyl]indenyl)zirconium dichloride, diethylsilanediylbis(2-methyl-4-[4'-tert-butylphenyl]indenyl)zirconium dichloride, dimethylsilanediylbis(2-ethyl-4-[4'-tert-butylphenyl]indenyl) zirconium dichloride, dimethyl-silanediylbis(2-propyl-4-[4'-tert-butylphenyl]indenyl)zirconium dichloride, dimethylsilanediylbis(2-isopropyl-4-[4'-tert-butylphenyl]indenyl)zirconium dichloride, dimethylsilanediylbis(2-n-butyl-4-[4'-tert-butylphenyl]indenyl)zirconium dichloride, dimethylsilanediylbis(2-hexyl-4-[4'-tert-butylphenyl]indenyl)zirconium dichloride, dimethylsilanediyl(2-isopropyl-4-phenylindenyl)(2-methyl-4-phenylindenyl)zirconium dichloride, dimethylsilanediyl(2-isopropyl-4-(1-naphthyl)indenyl)(2-methyl-4-(1-naphthyl)indenyl)zirconium dichloride, dimethylsilanediyl(2-isopropyl-4-[4'-tert-butylphenyl]indenyl)(2-methyl-4-[4'-tert-butylphenyl]indenyl)zirconium dichloride, dimethylsilanediyl(2-isopropyl-4-[4'-tert-butylphenyl]indenyl)(2-ethyl-4-[4'-tert-butylphenyl]indenyl) zirconium dichloride, dimethylsilanediyl(2-isopropyl-4-[4'-tert-butylphenyl]indenyl)(2-methyl-4-[3',5'-bis-tert-butylphenyl]indenyl)zirconium dichloride, dimethylsilanediyl(2-isopropyl-4-[4'-tert-butylphenyl]indenyl)(2-methyl-4-[1'-naphthyl]indenyl)-zirconium dichloride and ethylene(2-isopropyl-4-[4'-tert-butylphenyl]indenyl)(2-methyl-4-[4'-tert-butylphenyl]indenyl)zirconium dichloride, and also the corresponding dimethylzirconium, monochloromono(alkylaryloxy)zirconium and di(alkylaryloxy)zirconium compounds and the corresponding hafnocenes. The complexes can be used in the rac form, the meso form or as mixtures of these.

Among the metallocenes of the general formula (IV), those of the formula (IVB)

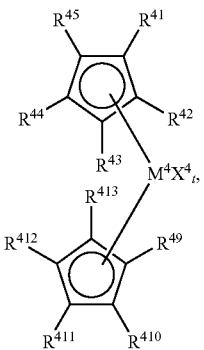

(IVB)

are especially preferred.

Further suitable Cp-free complexes have at least one ligand of the general formulae (VA) to (VE),

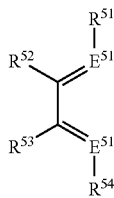 (VA)

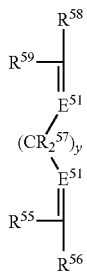 (VB)

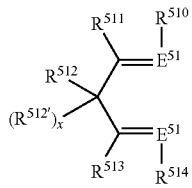 (VC)

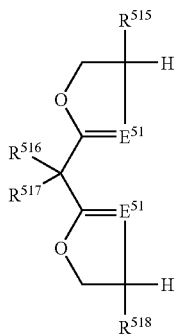 (VD)

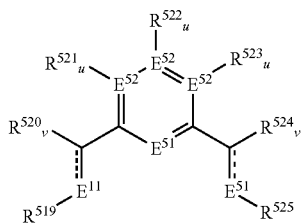 (VE)

where the transition metal is selected from among the elements Ti, Zr, Hf, Sc, V, Nb, Ta, Cr, Mo, W, Fe, Co, Ni, Pd, Pt and the elements of the rare earth metals. Preference is given to compounds having nickel, iron, cobalt or palladium as central metal.

$E^{51}$ is an element of group 15 of the Periodic Table of the Elements, preferably N or P, with particular preference being given to N. The two or three atoms $E^{51}$ in a molecule may be identical or different. The elements $E^{52}$ in the formula (VE) are each, independently of one another, carbon, nitrogen or phosphorus, in particular carbon.

The radicals $R^{51}$ to $R^{525}$, which can be identical or different within a ligand system (VA) to (VE), are the following groups:

$R^{51}$ and $R^{54}$ are each, independently of one another, $C_1$-$C_{10}$-alkyl, 5- to 7-membered cycloalkyl or cycloalkenyl, $C_2$-$C_{22}$-alkenyl, $C_6$-$C_{40}$-aryl or arylalkyl having from 1 to 10 carbon atoms in the alkyl radical and from 6 to 20 carbon atoms in the aryl radical, where the organic radicals $R^{51}$ and $R^{54}$ may also be substituted by halogens, with preference being given to hydrocarbon radicals in which the carbon atom adjacent to the element $E^{51}$ is bound to at least two carbon atoms, $R^{52}$ and $R^{53}$ are each, independently of one another, hydrogen, $C_1$-$C_{10}$-alkyl, 5- to 7-membered cycloalkyl or cycloalkenyl, $C_2$-$C_{22}$-alkenyl, $C_6$-$C_{40}$-aryl or arylalkyl having from 1 to 10 carbon atoms in the alkyl radical and from 6 to 20 carbon atoms in the aryl radical, where the organic radicals $R^{52}$ and $R^{53}$ may also be substituted by halogens and $R^{52}$ and $R^{53}$ may also together form a ring system in which one or more heteroatoms may also be present, $R^{55}$ to $R^{59}$ are each, independently of one another, hydrogen, $C_1$-$C_{10}$-alkyl, 5- to 7-membered cycloalkyl or cycloalkenyl, $C_2$-$C_{22}$-alkenyl, $C_6$-$C_{40}$-aryl or arylalkyl having from 1 to 10 carbon atoms in the alkyl radical and from 6 to 20 carbon atoms in the aryl radical, where the organic radicals $R^{55}$ to $R^{59}$ may also be substituted by halogens and $R^{56}$ and $R^{55}$ or $R^{58}$ and $R^{59}$ or two $R^{57}$ may together form a ring system, $R^{510}$ and $R^{514}$ are each, independently of one another, $C_1$-$C_{10}$-alkyl, 5- to 7-membered cycloalkyl or cycloalkenyl, $C_2$-$C_{22}$-alkenyl, $C_6$-$C_{40}$-aryl or arylalkyl having from 1 to 10 carbon atoms in the alkyl radical and from 6 to 20 carbon atoms in the aryl radical, where the organic radicals $R^{510}$ and $R^{514}$ may also be substituted by halogens, $R^{511}$, $R^{512}$, $R^{512'}$ and $R^{513}$ are each, independently of one another, hydrogen, $C_1$-$C_{10}$-alkyl, 5- to 7-membered cycloalkyl or cycloalkenyl, $C_2$-$C_{22}$-alkenyl, $C_6$-$C_{40}$-aryl or arylalkyl having from 1 to 10 carbon atoms in the alkyl radical and from 6 to 20 carbon atoms in the aryl radical, where the organic radicals $R^{511}$, $R^{512}$, $R^{512'}$ and $R^{513}$ may also be substituted by halogens and two or more geminal or vicinal radicals $R^{511}$, $R^{512'}$, $R^{512'}$ and $R^{513}$ may together form a ring system, $R^{515}$ to $R^{518}$ and $R^{520}$ to $R^{524}$ are each, independently of one another, hydrogen, $C_1$-$C_{10}$-alkyl, 5- to 7-membered cycloalkyl or cycloalkenyl, $C_2$-$C_{22}$-alkenyl, $C_6$-$C_{40}$-aryl, arylalkyl having from 1 to 10 carbon atoms in the alkyl radical and from 6 to 20 carbon atoms in the aryl radical or —$SiR^{526}_3$, where the organic radicals $R^{515}$-$R^{518}$ and $R^{520}$-$R^{524}$ may also be substituted by halogens and two vicinal radicals $R^{15D}$-$R^{518}$ and $R^{520}$-$R^{524}$ may also be joined to form a five- or six-membered ring, $R^{519}$ and $R^{525}$ are each, independently of one another, $C_6$-$C_{40}$-aryl, arylalkyl having from 1 to 10 carbon atoms in the alkyl radical and 6-20 carbon atoms in the aryl radical or —$NR^{526}_2$, where the organic radicals $R^{519}$ and $R^{525}$ may also be substituted by halogens or a group comprising Si, N, P, O or S, $R^{520}$ to $R^{524}$ are each, independently of one another, hydrogen, $C_1$-$C_{10}$-alkyl, 5- to 7-membered cycloalkyl or cycloalkenyl, $C_2$-$C_{22}$-alkenyl, $C_6$-$C_{40}$-aryl, arylalkyl having from 1 to 10 carbon atoms in the alkyl radical and 6-20 carbon atoms in the aryl radical, $NR^{526}_2$, —$SiR^{526}_3$, where the organic radicals $R^{520}$ to $R^{525}$ may also be substituted by halogens and/or two geminal or vicinal radicals $R^{520}$ to $R^{525}$ may also be joined to form a five-, six- or seven-membered ring, and/or two geminal or vicinal radicals $R^{520}$ to $R^{525}$ are joined to form a five-, six- or seven-membered heterocycle which comprises at least one atom from the group consisting of N, P, O and S, the radicals $R^{526}$ are each, independently of one another, hydrogen, $C_1$-$C_{20}$-alkyl, 5- to 7-membered cycloalkyl or cycloalkenyl, $C_2$-$C_{20}$-alkenyl, $C_6$-$C_{40}$-aryl or arylalkyl having from 1 to 10 carbon atoms in the alkyl radical and 6-20 carbon atoms in the aryl radical and two radicals $R^{526}$ may also be joined to form a five- or six-membered ring, u is 0 when $E^{52}$ is nitrogen or phosphorus and is 1 when $E^{52}$ is carbon, the indices v are each, independently of one another, 1 or 2, with the bond between the carbon which then bears one radical and the adjacent element $E^{1D}$ being a double bond when v is 1 and the bond between the carbon which then bears two radicals and the adjacent element $E^{51}$ being a single bond when v is 2, x is 0 or 1, with the complex of the formula (IVC) being negatively charged when x is 0, and y is an integer from 1 to 4, preferably 2 or 3.

Cp-free complexes having Fe, Co, Ni, Pd or Pt as central metal and ligands of the formula (VA) are particularly useful.

Special preference is given to iron or cobalt coordination compounds of formula (VI)

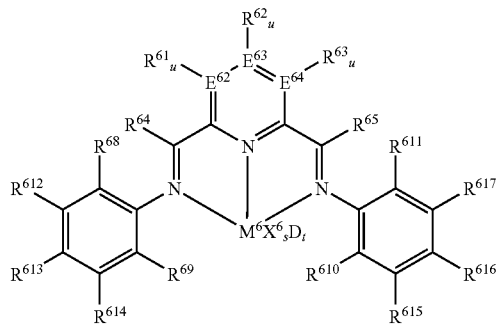

(VI)

where $M^6$ is Fe or Co, in particular Fe $E^{62}$-$E^{64}$ are each, independently of one another, carbon, nitrogen or phosphorus, in particular carbon, $R^{61}$-$R^{63}$ are each, independently of one another, hydrogen, $C_1$-$C_{22}$-alkyl, $C_2$-$C_{22}$-alkenyl, $C_6$-$C_{22}$-aryl, arylalkyl having from 1 to 10 carbon atoms in the alkyl part and 6-20 carbon atoms in the aryl part, halogen, $NR^{618}_2$, $OR^{618}$, $SiR^{619}_3$, where the organic radicals $R^{61}$-$R^{63}$ may also be substituted by halogens and/or two vicinal radicals $R^{61}$-$R^{63}$ may also be joined to form a five-, six- or seven-membered ring, and/or two vicinal radicals $R^{61}$-$R^{63}$ are bound to form a five-, six- or seven-membered heterocycle containing at least one atom from the group consisting of N, P, O and S, $R^{64}$-$R^{66}$ are each, independently of one another, hydrogen, $C_1$-$C_{22}$-alkyl, $C_2$-$C_{22}$-alkenyl, $C_6$-$C_{22}$-aryl, arylalkyl having from 1 to 10 carbon atoms in the alkyl part and 6-20 carbon atoms in the aryl part, $NR^{618}_2$, $SiR^{619}_3$, where the organic radicals $R^{4C}$-$R^{5C}$ may also be substituted by halogens, u is 0 when $E^{62}$-$E^{64}$ is nitrogen or phosphorus and is 1 when $E^{62}$-$E^{64}$ is carbon, $L^{61}$-$L^{62}$ are each, independently of one another, nitrogen or phosphorus, in particular nitrogen, $R^{68}$-$R^{611}$ are each, independently of one another, hydrogen, $C_1$-$C_{22}$-alkyl, $C_2$-$C_{22}$-alkenyl, $C_6$-$C_{22}$-aryl, arylalkyl having from 1 to 10 carbon atoms in the alkyl part and 6-20 carbon atoms in the aryl part, halogen, $NR^{618}_2$, $OR^{618}$, $SiR^{619}_3$, where the organic radicals $R^{68}$-$R^{611}$ may also be substituted by halogens and/or two vicinal radicals $R^{68}$-$R^{617}$ may also be joined to form a five-, six- or seven-membered ring, and/or two vicinal radicals $R^{68}$-$R^{617}$ are joined to form a five-, six- or seven-membered heterocycle containing at least one atom from the group consisting of N, P, O and S, with the proviso that at least one of the radicals $R^{68}$-$R^{611}$ is hydrogen.

$R^{612}$-$R^{617}$ are each, independently of one another, hydrogen, $C_1$-$C_{22}$-alkyl, $C_2$-$C_{22}$-alkenyl, $C_6$-$C_{22}$-aryl, arylalkyl having from 1 to 10 carbon atoms in the alkyl part and 6-20 carbon atoms in the aryl part, halogen, $NR^{618}_2$, $OR^{618}$, $SiR^{619}_3$, where the organic radicals $R^{612}$-$R^{617}$ may also be substituted by halogens and/or two vicinal radicals $R^{68}$-$R^{617}$ may also be joined to form a five-, six- or seven-membered ring, and/or two vicinal radicals $R^{68}$-$R^{617}$ are joined to form a five-, six- or seven-membered heterocycle containing at least one atom from the group consisting of N, P, O or S, the indices v are each, independently of one another, 0 or 1, the radicals $X^6$ are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, arylalkyl having 1-10 carbon atoms in the alkyl part and 6-20 carbon atoms in the aryl part, $NR^{618}_2$, $OR^{618}$, $SR^{618}$, $SO_3R^{618}$, $OC(O)R^{618}$, CN, SCN, β-diketonate, CO, $BF_4^-$, $PF_6^-$ or a bulky noncoordinating anion and the radicals $X^6$ may be joined to one another, the radicals $R^{618}$ are each, independently of one another, hydrogen, $C_1$-$C_{20}$-alkyl, $C_2$-$C_{20}$-alkenyl, $C_6$-$C_{20}$-aryl, arylalkyl having from 1 to 10 carbon atoms in the alkyl part and 6-20 carbon atoms in the aryl part, $SiR^{619}_3$, where the organic radicals $R^{618}$ may also be substituted by halogens and nitrogen- and oxygen-containing groups and two radicals $R^{618}$ may also be joined to form a five- or six-membered ring, the radicals $R^{619}$ are each, independently of one another, hydrogen, $C_1$-$C_{20}$-alkyl, $C_2$-$C_{20}$-alkenyl, $C_6$-$C_{20}$-aryl, arylalkyl having from 1 to 10 carbon atoms in the alkyl part and 6-20 carbon atoms in the aryl part, where the organic radicals $R^{19C}$ may also be substituted by halogens or nitrogen- and oxygen-containing groups and two radicals $R^{619}$ may also be joined to form a five- or six-membered ring, s is 1, 2, 3 or 4, in particular 2 or 3, D is an uncharged donor and t is from 0 to 4, in particular 0, 1 or 2.

The embodiments and preferred embodiments described above likewise apply to $E^{62}$-$E^{64}$, $R^{61}$-$R^{63}$, $X^C$, $R^{618}$ and $R^{619}$.

The substituents $R^{64}$-$R^{65}$ can be varied within a wide range. Possible carboorganic substituents $R^{64}$-$R^{65}$ are, for example, the following: hydrogen, $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropyl, cyclobutyl, cyclopeantyl, cyclohexyl, cycloheptyl, cyclooctyl, cyclononyl or cyclododecyl, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-phenylethyl, where the organic radicals $R^{64}$-$R^{66}$ may also be substituted by halogens such as fluorine, chlorine or bromine. Furthermore, $R^{64}$-$R^{66}$ can be amino $NR^{618}_2$ or $N(SiR^{619}_3)_2$, for example dimethylamino, N-pyrrolidinyl or picolinyl. Possible radicals $R^{619}$ in organosilicon substituents $SiR^{619}_3$ are the same carboorganic radicals as described above for $R^{61}$-$R^{63}$, where two radicals $R^{619}$ may also be joined to form a 5- or 6-membered ring, e.g. trimethylsilyl, triethylsilyl, butyldimethylsilyl, tributylsilyl, tritert-butylsilyl, triallylsilyl, triphenylsilyl or dimethylphenylsilyl. These $SiR^{619}_3$ radicals can also be bound via nitrogen to the carbon bearing them.

Preferred radicals $R^{64}$-$R^{65}$ are hydrogen, methyl, ethyl, n-propyl, isopropyl, n-butyl, isobutyl, tert-butyl, n-pentyl, n-hexyl, n-heptyl, n-octyl or benzyl, in particular methyl.

The substituents $R^{68}$-$R^{617}$ can be varied within a wide range. Possible carboorganic substituents $R^{68}$-$R^{617}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-phenylethyl, where two radicals $R^{68}$ to $R^{617}$ may also be joined to form a 5-, 6- or 7-membered ring and/or two of the vicinal radicals $R^{68}$-$R^{617}$ may be joined to form a five-, six- or seven-membered heterocycle containing at least one atom from the group consisting of N, P, O and S and/or the organic radicals $R^{68}$-$R^{617}$ may also be substituted by halogens such as fluorine, chlorine or bromine. Furthermore, $R^{68}$-$R^{617}$ can be halogen such as fluorine, chlorine, bromine, amino $NR^{618}_2$ or $N(SiR^{619}_3)_2$, alkoxy or aryloxy $OR^{618}$, for example dimethylamino, N-pyrrolidinyl, picolinyl, methoxy, ethoxy or isopropoxy. Possible radicals $R^{619}$ in organosilicon substituents $SiR^{619}_3$ are the same carboorganic radicals which have been mentioned above for $R^{61}$-$R^{63}$, where two radicals $R^{619}$ may also be joined to form a 5- or 6-membered ring, e.g. trimethylsilyl, triethylsilyl, butyldimethylsilyl, tributylsilyl, tritert-butylsilyl, triallylsilyl, triphenylsilyl or dimethylphenylsilyl. These $SiR^{19C}_3$ radicals can also be bound via an oxygen or nitrogen, for example trimethylsilyloxy, triethylsilyloxy, butyldimethylsilyloxy, tributylsilyloxy or tritert.butylsilyloxy.

Preferred radicals $R_{612}$-$R_{617}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine, in particular hydrogen. In particular, $R^{613}$ and $R^{616}$ are each methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine or bromine and $R^{612}$, $R^{614}$, $R^{615}$ and $R^{617}$ are each hydrogen.

Preferred radicals $R^{68}$-$R^{611}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine.

In particular, $R^{612}$, $R^{614}$, $R^{615}$ and $R^{617}$ are identical, $R^{613}$ and $R^{616}$ are identical, $R^{69}$ and $R^{611}$ are identical and $R^{68}$ and $R^{610}$ are identical. This is also preferred in the preferred embodiments described above.

Catalysts based on chromium, e.g. Phillips catalysts, or Ziegler-Natta catalysts are also suitable as transition metal components from which the catalysts used in the inventive method of polymerizing olefins can be obtained.

Ziegler-Natta catalysts generally comprise a titanium- or vanadium-comprising solid component which is prepared using titanium or vanadium compounds and also inorganic or polymeric finely divided supports, compounds of magnesium, halogen compounds and electron donor compounds. For the purposes of the present invention, the term Ziegler catalysts encompasses those referred to in the literature as Ziegler-Natta catalysts. In contrast to the known Ziegler-Natta catalysts the support is here provided in form of electrospun fibers. The reagents to prepare the support are combined and subsequently electrospun. It is also possible to combine all reagents needed for the preparation of the supported catalyst before the spin process.

Phillips catalysts are usually prepared by applying a chromium compound to an inorganic support and subsequently calcining this at temperatures in the range from 350 to 950° C., resulting in chromium present in valences lower than six being converted into the hexavalent state. Apart from chromium, further elements such as Mg, Ca, B, Al, P, Ti, V, Zr and Zn can also be used. Particular preference is given to the use of Ti, Zr or Zn. It may be emphasized that combinations of the abovementioned elements are also possible according to the invention. The catalyst precursor can also be doped with fluoride prior to or during calcination. Examples for supports for Phillips catalysts are aluminum oxide, silicon dioxide (silica gel), titanium dioxide, zirconium dioxide or their mixed oxides or cogels, or aluminum phosphate fibers prepared by electrospinning. Further suitable support materials can be obtained by modifying the pore surface area, e.g. by means of compounds of the elements boron, aluminum, silicon or phosphorus. The activated chromium catalysts can subsequently be prepolymerized or prereduced. The prereduction is usually carried out by means of CO or else by means of hydrogen at 250-500° C., preferably at 300-400° C., in an activator.

The catalyst system may comprise the support and as an activator one or more organometallic compounds. That means that the nanofibers or nanofiber fleeces may only supported with e.g. alkylaluminum or aluminoxane, which in contact with a catalyst e.g. a transition metal complex enables the polymerization of olefinic monomers.

Especially preferred, however, are catalyst systems comprising nanofibers of water soluble polymers, e.g. polyvinyl acetate to which firstly an aluminoxane, preferably methylaluminoxane (MAO) is applied. For forming a catalyst system subsequently, the catalyst compound, one or in case of a hybrid catalyst more of the above described catalyst compounds may be applied.

It is also possible to provide supports by reaction of organic polymer nanofiber supports comprising hydroxyl groups with metal alkyls, e.g. aluminium alkyls, methylaluminoxane, magnesium alkyls, transition metal alkyls, e.g. tetrabenzylzirconium or tetraneophyltitanium (wherein alkyls do not include β-hydrogen).

Fibers prepared of compounds comprising an inorganic component with exchangeable metal ions may be partially or totally loaded with transition metal cations. Examples for these supports are supports made of polymethacrylic acid or carboxymethyl cellulose fibers where the sodium cations of sodium carboxylate can be exchanged by Mg(II+), Al(III+) or Zn(II+).

Further possible supports are fibers made of inorganic materials, e.g. MgCl$_2$ or SiO$_2$, are described by Elmarco s.r.o. Liberec, CZ (www.elmarco.com) and by Greiner, A, Wendorff, J. H., in Angewandte Chemie 2007, 119, 5770-5870.

Supports may also be produced by electrospinning of water soluble polymers with cation exchangeable inorganic materials (e.g. phyllosilicates) which had been—prior to the spinning process been modified partially or totally by transition metal cations (e.g. Cr(III)). The catalyst system is formed by the addition of appropriate activators and ligands.

The inventive methods are suitable for the polymerization of olefinically unsaturated monomers. Suitable monomers can be functionalized olefinically unsaturated compounds such as ester or amide derivatives of acrylic or methacrylic acid, for example acrylates, methacrylates or acrylonitrile. Preference is given to nonpolar olefinic compounds, including aryl-substituted α-olefins. Particularly preferred α-olefins are linear or branched $C_2$-$C_{12}$-1-alkenes, in particular linear $C_2$-$C_{10}$-1-alkenes such as ethylene, propylene, 1-butene, 1-pentene, 1-hexene, 1-heptene, 1-octene, 1-decene or branched $C_2$-$C_{10}$-1-alkenes such as 4-methyl-1-pentene, conjugated and nonconjugated dienes such as 1,3-butadiene, 1,4-hexadiene or 1,7-octadiene or vinylaromatic compounds such as styrene or substituted styrene. It is also possible to polymerize mixtures of various α-olefins. Suitable olefins also include ones in which the double bond is part of a cyclic structure which can comprise one or more ring systems. Examples are cyclopentene, norbornene, tetracyclododecene or methylnorbornene or dienes such as 5-ethylidene-2-norbornene, norbornadiene or ethylnorbornadiene. It is also possible to polymerize mixtures of two or more olefins.

In particular, the catalyst of the invention can be used for the polymerization or copolymerization of ethylene or propylene. As comonomers in the polymerization of ethylene, preference is given to using $C_3$-$C_8$-α-olefins, in particular 1-butene, 1-pentene, 1-hexene and/or 1-octene. Preferred comonomers in the polymerization of propylene are ethylene and/or butene. Particular preference is given to a process in which ethylene is copolymerized with 1-hexene or 1-butene.

The inventive method of polymerizing olefins can be carried out at temperatures in the range from 0 to 200° C., preferably from 25 to 150° C. and particularly preferably from 40 to 130° C., and under pressures of from 0.05 to 10 MPa, particularly preferably from 0.3 to 4 MPa, using all industrially known polymerization processes. The polymerization can be carried out batchwise or continuously in one or more stages. Solution processes, suspension processes, stirred gas-phase processes or gas-phase fluidized processes are all possible. Processes of this type are generally known to those skilled in the art.

The supported or unsupported catalyst components or catalsts can be subjected to a prepolymerization before use. The prepolymerization can be carried out in suspension or in monomer (bulk) or in the gas phase, and can be carried out continuously in a prepolymerization unit installed upstream of the polymerization reactor or in a discontinuous prepolymerization unit independent of the reactor operation.

In the case of suspension polymerizations, the polymerization is usually carried out in a suspension medium, preferably in an inert hydrocarbon such as isobutane or mixtures of hydrocarbons or else in the monomers themselves. The suspension polymerization temperatures are usually in the range from −20 to 115° C., and the pressure is in the range from 0.1 to 10 MPa. The solids content of the suspension is generally in the range from 10 to 80%. The polymerization can be carried out either batchwise, e.g. in stirring autoclaves, or continuously, e.g. in tube reactors or in loop reactors, e.g. by the Phillips-PF process as described in U.S. Pat. Nos. 3,242,150 and 3,248,179.

The different or else identical polymerization processes can, if desired, also be connected in series so as to form a polymerization cascade as for example in the Hostalen® process. A parallel reactor arrangement using two or more identical or different processes is also possible. However, the polymerization is preferably carried out in only a single reactor.

With the process of the present invention it is possible to improve the distribution of the nanofiber or nanofiber fleece in the polymer matrix. The polymer precipitates on the nanofiber forming a core/shell fiber or fiber fleece. The polymerized nanofibers show a very good adhesion to the bulk material.

Surprisingly ultrahigh molecular polyolefins may be obtained using simple metallocenes as catalysts which as homogenous and conventionally supported catalysts generally lead to polyolefins with significantly lower molecular weights. In general these polyolefins have molecular weights (Mw) of more than 1,000,000 g/mol.

Further, it is possible to control morphology of the polymers. That means that it is possible to obtain polymers as fibers or polymer fiber fleeces of ultra high molecular weight.

The polymers obtained using nanofiber supported catalysts of the present invention have very high intrinsic viscosities of more than 4 dl/g, preferably more than 6 dl/g and especially preferred more than 8 dl/g.

The polymers obtained using such single-site catalysts in which only one type of catalytically active center have a relatively uniform distribution of the polymer chains in respect of the molecular weight, the comonomer distribution and, if appropriate, the stereoregularity. However, for many applications it is not advantageous to use very uniform polymers.

One possible way of preparing monomers having relatively broad distributions in a targeted manner is to mix different, separately prepared, polymers with one another. A further possible way which is frequently used on an industrial scale for polyolefins is to produce the polymers in a multistage polymerization process (cascade), with polymerization being carried out under different conditions in the different stages. In this way, too, it is possible to produce polymers having relatively broad distributions in a targeted manner.

However, for economic reasons and also with a view to wider availability of such reactors, efforts have been made for some time to prepare polymer blends even in continuous processes using a single reactor. To achieve this objective, catalyst mixtures or catalysts having different active centers, known as hybrid catalysts, have frequently been described in the prior art. Hybrid catalysts can be catalysts which comprise active centers of different classes of catalysts. It is possible to use any combination of two or more of the above discussed catalysts for forming a hybrid system.

A preferred hybrid catalyst system for example is the combination of a nanofiber supported with a single site catalyst according to the invention and a conventionally catalyst, e.g. a non-supported or conventionally supported catalyst. One example is a combination of a metallocene supported on a nanofiber, e.g. a polyvinyl alcohol fiber and a Ziegler-Natta catalyst supported on MgCl$_2$ particulate material.

A further preferred system for example is the combination of two metallocene catalysts. Both metallocene catalysts may be applied to a nanofiber support already supported with an activator. But it is also possible to apply only a first metallocene to the catalyst component comprising support and activator and adding the second to the polymerization medium.

The hybrid catalysts are suitable for producing bimodal or multimodal polymer products comprising at least a higher molecular weight polymer component and a lower molecular weight polymer component. A polymer is bimodal when it has two different polymer components, and a polymer is multimodal when it has more than two different polymer components. A polymer component is, logically, a polymer which has been produced by one specific type of active component in a polymerization catalyst comprising a plurality of components.

It is possible to prepare reactor blends comprising high molecular weight polyolefin nanofibers having a molecular weight (Mw) of more than 1,000,000 g/mol and polyolefins having molecular weight (Mw) of less than 500,000 g/mol.

Hybrid catalysts systems which may be mixtures of catalyst systems of the invention and conventional catalyst systems may be used for the preparation of reactor blends having bimodal or multimodal molecular weight distributions.

New reactor blends may be prepared from polyolefins and polyolefin nanofibers. The matrix of these nanocomposites consists of polyolefins and thus may be totally recycled.

Of course, it is also possible to prepare blends, e.g. extruder blends, by mixing different, separately prepared, uniform polymers with one another at least one of these being a nanocomposite according to the invention. A further possible way which is frequently used on an industrial scale for polyolefins is to produce the polymers in a multistage polymerization process (cascade), with polymerization being carried out under different conditions in the different stages, in the first stage preparing a nanocomposite compound according to the invention and in the second and eventually following stages forming a polymer having another molecular weight distribution. In this way, too, it is possible to produce polymers having relatively broad or multimodal distributions.

The nanofibers may provide several advantages, e.g. an improved wear resistance of the polymer, the possibility of orientation of the nanofibers during stretching (blow molding, foil extrusion, deep drawing), the introduction of additives by nanofibers and nano fiber fleeces, e.g. bonding agents for implying adhesiveness.

Carbonized nanofibers may imply conductivity and electromagnetic shielding.

In the following the invention will be described in detail with reference to the accompanying examples and drawing. In the drawing:

FIG. 1 shows an apparatus for preparing a nanofiber fleece.

Pictures of PVA-nanofiber fleeces were made by Environmental Scanning Electron Microscopy (ESEM) (Example 1).

Pictures of PVA-nanofiber fleeces were made by Environmental Scanning Electron Microscopy (ESEM) after loading PVA nanofibers with MAO and bis(pentadienyl) zirconium dichloride and performing heterogenous polymerization of olefins in presence of the catalyst system (Example 3).

The parameters used in the present patent application were determined in the following way:

Intrinsic Viscosity [dl/g]

The determination of the intrinsic viscosity η, which is the limiting value of the viscosity number on extrapolation of the polymer concentration to zero, was carried out on an automatic Ubbelohde viscometer (Lauda PVS 1) using decaline as solvent at 135° C. in accordance with ISO 1628.

Molecular Weight Distribution:

The determination of the molecular weight distribution Mw was carried out by means of high-temperature gel permeation chromatography on a WATERS 150 C using a method based on DIN 55672 and the following columns connected in series: 3× SHODEX AT 806 MS, 1× SHODEX UT 807 and 1× SHODEX AT-G under the following conditions: solvent: 1,2,4-trichlorobenzene (stabilized with 0.025% by weight of 2,6-di-tert-butyl-4-methylphenol), flow: 1 ml/min, 500 µl injection volume, temperature: 135° C., calibration using PE Standards. Evaluation was carried out using WIN-GPC.

Mean Fiber Diameter

The mean fiber diameter was determined by measuring the thickness of 50 to 100 fibers in an ESEM picture and calculating the arithmetic mean.

The contents of the abovementioned documents are hereby incorporated by reference into the present patent application. Unless indicated otherwise, amounts and ratios are always based on the weight.

EXAMPLES

The preparation of polyethylene with a single-site catalyst supported on PVA-nanofibers
The preparation is basically divided into 3 steps:
1. Preparation of PVA nanofiber fleece
2. Support of MAO/catalyst system
3. Ethylene polymerization Example 1

First a PVA fiber fleece was prepared by electospinning a PVA solution ($M_w$=16.000 g/mol, 98-99 mol % hydrolysis (available from Aldrich)). The PVA fibers have a mean diameter between 100 and 250 nm.

The electrospinning trials were performed with the spinning apparatus schematically shown in FIG. 1. The polymer solution is filled into a 2 ml syringe 4. The syringe is passed through a hole in the bottom of a 50 ml perfusor syringe 5 and is fixed within it between bottom and piston. A continuous flow of solution through a straight cut needle of a syringe is ensured by the syringe pump Pilot A2 of Fa. Fresenius Fial Infusion Technology. The flow rate of the solution was ⅛ of the delivering rate of the syringe pump.

A voltage is applied to the needle of the syringe by the voltage generator KNH34/P2A of Eltex. A metal plate serves as a backplate electrode; on the metal plate the electrically conducting collector surface 1 is also fixed. The collector surface 1 is a piece of aluminum foil of 15×15 $cm^2$. The fibers are spun horizontally onto the backplate electrode, which is positioned in a variable distance to the syringe.

For preparing the PVA-solution the corresponding amount of PVA (2 g) was added to water (8 ml). PVA was dissolved by heating the suspension to 80° C. while rotating the flask for several hours (rotary evaporator). The amount of water removed by distillation was determined and subsequently added to the solution. After another half hour of rotating the flask at room temperature, a homogenous solution was obtained.

The PVA-solution was spun at a flow rate of 0.1 ml/h, a distance between needle tip and collector surface of 20 cm and a voltage of 25 kV for about 2 h. The obtained fiber fleece was dried on the aluminum foil for 24 h. The fiber fleece was removed from the collector surface and subsequently put into a reaction tube. About 50 mg of PVA-fibers were used for one sample. The structure of the fiber fleece was subsequently analysed with an ESEM. The diameter of the fibers was from about 100-250 nm.

Example 2

Support of MAO and Catalyst
Catalyst: Cp*$_2$ZrCl$_2$ (M: 432.58 g/mol)

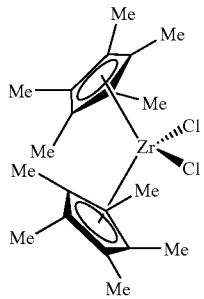

6 ml of absolute toluene were added to the PVA fibers obtained in example 1.1. Some swelling of the fleece could be observed, but the structure remained intact.

Then 1.5 ml of MAO solution (c(al-w %): 4.84 g/ml) was added to the fibers. A slight production of hydrogen could be observed.

After production of gas was finished additional 0.5 ml of the MAO-solution was added to the dispersion. No production of gas could be observed and stirring was continued for another 30 min, subsequently the solvent was removed under vacuum and washed twice with 10 ml toluene. Then another 5 ml of toluene were added.

In a second reaction tube 2 mg of the bis-(pentamethyl cyclopentadienyl) zirconium dichloride catalyst (available from Sigma-Aldrich) were dissolved in 5 ml toluene. The solution was stirred for 5 min. Then 1 ml of the catalyst solution was added to the MAO-PVA-fiber dispersion. Stirring was continued for further 5 min. A slight yellow colour of the fibers was observed while the solution was clear. Then 2 times 1 ml of the Cat solution was added. After three times of addition no complete decolourization detected. The solvent was removed in vacuum and the residue was washed with 5 ml of toluene. Subsequently, 10 ml of toluene were added to the fibers.

Example 3

Polymerization of Ethylene

The plug of the reaction tube containing the supported catalyst obtained from example 2 was replaced by a septum. Ethylene (Air Liquide) at a pressure of 0.2 bar was fed into the dispersion via a steel cannula. Previous flushing of the ethylene pipe ensures that no air residues remain in the pipe. The overpressure of ethylene was removed via a second cannula in the septum. The polymerization was performed at a pressure of 1 bar ethylene. After about 2 min a polyethylene formation on the fibers could be observed. Ethylene was feeded for another 30 min. The polymerization was stopped by addition of 100 ml methanol, to which 0.5 ml conc. HCl and a spatula tip of stabilising agent (Irganox 1010) were added. The dispersion in a methanol/HCl solution was stirred for another 30 min and subsequently filtered off. PE was dried at 60° C. in vacuum for 16 h. The fiber structure was examined with an ESEM, a mean fiber diameter between 300 and 700 nm was determined.

Yield: 450 mg
Intrinsic viscosity: 8.34 dl/g

For the first time it could be shown that PVA fibers are suitable as a support material for preparation of polyolefins. Further, the fiberlike structure of the support has influence on the morphology of the produced polyethylene. It is shown that the fiber structure and thus the structure of the fleece remains basically unchanged.

An increase of the mean diameter of the pure PVA-fibers could be observed from 100-250 nm to a diameter of the PE-fibers of 300-700 nm.

The invention claimed is:

1. Supported catalyst system for polymerization of olefins, comprising:
   a support made of fibers or a fleece of fibers, wherein the mean fiber diameter is less than 1000 nm and the mean fiber length is more than 200,000 nm, the support comprising a transition metal compound,
   at least one organometallic compound supported on the fiber support, the organometallic compound being selected from organometallic compounds of formula I:

where
$M^1$ is an element of a main group of the Periodic Table of the Elements,
$R^{11}$ is hydrogen, $C_1$-$C_{10}$-alkyl, $C_6$-$C_{15}$-aryl, halo-$C_1$-$C_{10}$-alkyl, halo-$C_6$-$C_{15}$-aryl, $C_7$-$C_{40}$-arylalkyl, $C_7$-$C_{40}$-alkylaryl, $C_1$-$C_{10}$-alkoxy or halo-$C_7$-$C_{40}$-alkylaryl, halo-$C_7$-$C_{40}$-arylalkyl or halo-$C_1$-$C_{10}$-alkoxy,
$R^{12}$ and $R^{13}$ are each hydrogen, halogen, $C_1$-$C_{10}$-alkyl, $C_6$-$C_{15}$-aryl, halo-$C_1$-$C_{10}$-alkyl, halo-$C_6$-$C_{15}$-aryl, $C_7$-$C_{40}$-arylalkyl, $C_7$-$C_{40}$-alkylaryl, $C_1$-$C_{10}$-alkoxy or halo-$C_7$-$C_{40}$-alkylaryl, halo-$C_7$-$C_{40}$-arylalkyl or halo-$C_1$-$C_{10}$-alkoxy,
r is an integer from 1 to 3
and
s and t are integers from 0 to 2, with the sum r+s+t corresponding to the valence of $M^1$,
or aluminoxane compounds of formula II or III:

where $R^{21}$-$R^{24}$ are each, independently of one another, a $C_1$-$C_6$-alkyl group.

2. Supported catalyst according to claim 1, comprising a support made of fibers or fleece of fibers, characterized in that the fiber or fiber fleece is prepared by electrospinning.

3. Supported catalyst system according to claim 2 characterized in that the fibers are made of polymer produced by electrospinning of a soluble polymer.

4. Supported catalyst system according to claim 3 characterized in that the soluble polymer is selected from the group consisting of polyvinyl alcohol, vinyl alcohol copolymers, vinyl pyrrolidone homopolymers and copolymers, methacrylic acid homopolymers and copolymers, and polysaccharides.

5. Process for preparing polyolefin nanocomposites characterized in that an olefin is polymerized in presence of a catalyst system according to claim 1.

6. Polyolefin nanocomposites obtained by a process according to claim 5 comprising nanofibers or nanofiber fleeces.

7. Polyolefin nanocomposites according to claim 6, comprising nanofibers or nanofiber fleeces, the fibers having a mean fiber diameter of less than 1000 nm.

8. Polyolefin nanocomposites according to claim 6 wherein the polyolefins have an intrinsic viscosity of more than 4 dl/g.

9. Blends comprising polyolefin nanocomposites according to claim 8 and at least one further polyolefin.

10. Supported catalyst system according to claim 1, characterized in that the mean fiber diameter is less than 500 nm and the mean fiber length is more than 500,000 nm.

* * * * *